United States Patent
Chen et al.

(10) Patent No.: US 9,635,549 B2
(45) Date of Patent: Apr. 25, 2017

(54) PROVIDING SUBSCRIBER IDENTITY MODULE FUNCTION

(75) Inventors: Canfeng Chen, Beijing (CN); Changjiang Zhang, Beijing (CN); Jianying Wen, Beijing (CN); Xuan Guo, Beijing (CN); Xin Zhang, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 329 days.

(21) Appl. No.: 14/240,665

(22) PCT Filed: Sep. 1, 2011

(86) PCT No.: PCT/CN2011/079255
§ 371 (c)(1),
(2), (4) Date: Feb. 24, 2014

(87) PCT Pub. No.: WO2013/029264
PCT Pub. Date: Mar. 7, 2013

(65) Prior Publication Data
US 2014/0213321 A1    Jul. 31, 2014

(51) Int. Cl.
*H04B 1/38*     (2015.01)
*H04W 12/06*   (2009.01)
(Continued)

(52) U.S. Cl.
CPC .......... *H04W 12/06* (2013.01); *H04B 1/3816* (2013.01); *H04M 1/72522* (2013.01); *H04W 8/183* (2013.01); *H04W 8/205* (2013.01)

(58) Field of Classification Search
CPC ...... H04W 48/18; H04W 88/02; H04W 88/06
(Continued)

(56) References Cited

U.S. PATENT DOCUMENTS 6,896,523 B2 * 5/2005 Nishizawa ............. G06K 19/07
439/60
7,243,856 B2    7/2007 Agami et al.
(Continued)

FOREIGN PATENT DOCUMENTS

CN           1829352         9/2006
CN         101616415       12/2009
(Continued)

OTHER PUBLICATIONS

"Secure Digital", Wikipedia, Retrieved on Aug. 20, 2014, Webpage available at : http://en.wikipedia.org/wiki/Sd_card.
(Continued)

*Primary Examiner* — Temica M Beamer
(74) *Attorney, Agent, or Firm* — Ditthavong & Steiner, P.C.

(57) ABSTRACT

A host processing apparatus (100) and a user removable memory (40) are disclosed. The host processing apparatus (100) and the user removable memory (40) are, in use, connected to one another by respective connectors. The user removable memory (40) is provided in the form of a secure digital (SD) memory card with an expanded subscriber identity module (SIM) function. The host processing apparatus (100) is configured to convert SIM-related request signals to file access signals which identify a location or locations on the user removable memory (40) and one or more file access functions. The file access signals are transferred to the user removable memory (40) via the connectors. The user removable memory (40) comprises a flash memory (59), a SIM (42) programmed with data associated with a communications system, and interface means (52) for receiving the file access signals from the host processing apparatus (100), and configured to identify from the location(s) therein whether a memory or SIM function is to be applied. If the latter, the received file access function(s)
(Continued)

are converted to SIM function(s) which are applied to the SIM (42) for transferring results back to the host processing apparatus (100).

17 Claims, 7 Drawing Sheets

(51) Int. Cl.
*H04B 1/3816* (2015.01)
*H04W 8/18* (2009.01)
*H04W 8/20* (2009.01)
*H04M 1/725* (2006.01)

(58) Field of Classification Search
USPC .............................................. 455/552.1, 558
See application file for complete search history.

(56) References Cited

U.S. PATENT DOCUMENTS

| | | | |
|---|---|---|---|
| 7,349,719 B2 | 3/2008 | Buniatyan | |
| 7,556,534 B1* | 7/2009 | Ho | H01R 13/6586 |
| | | | 439/540.1 |
| 7,572,152 B2 | 8/2009 | Mosek et al. | |
| 2003/0112611 A1 | 6/2003 | Nishizawa et al. | |
| 2004/0143641 A1 | 7/2004 | de Jong | |
| 2007/0054655 A1* | 3/2007 | Fantini | H04L 63/0853 |
| | | | 455/411 |
| 2009/0287636 A1 | 11/2009 | Ren et al. | |

FOREIGN PATENT DOCUMENTS

| | | |
|---|---|---|
| CN | 101853184 | 10/2010 |
| EP | 1679641 | 7/2006 |
| WO | 02/13021 A2 | 2/2002 |

OTHER PUBLICATIONS

"Universal Integrated Circuit Card", Wikipedia, Retrieved on Aug. 20, 2014, Webpage available at : http://en.wikipedia.org/wiki/UICC.

"Combined micro SD and SIM card connector", Global Connector Technology, Retrieved on Jul. 7, 2011, Webpage available at : http://www.directindustry.com/prod/global-connector-technology/combined-micro-sd-and-sim-card-connectors-55927-482879.html.

International Search Report received for corresponding Patent Cooperation Treaty Application No. PCT/CN2011/079255 , dated Dec. 29, 2011, 4 pages.

Jiang et al. "uSD: Universal Sensor Data Entry Card" IEEE Transactions on Consumer Electronics, vol. 56, No. 3, Aug. 2010.

"Virtual SIM Allows Multiple Connections on a Mobile Handset", http://www.pcworld.com/businesscenter/article/184069/virtual_sim_allows_multiple_connections_on_a_mobile_handset.html.

"Bluetooth Profile", http://en.wikipedia.org/wiki/Bluetooth_profile#SIM_Access_Profile_.28SAP.2C_SIM.2C_rSAP.29.

"Subscriber Identity Module", http://en.wikipedia.org/wiki/Subscriber_Identity_Module#Authentication_key_.28Ki.29.

* cited by examiner

PROVIDING SUBSCRIBER IDENTITY MODULE FUNCTION

FIELD

The invention relates to apparatuses and methods relating to a user removable memory, particularly, though not exclusively, a Secure Digital (SD) memory card, providing a SIM function.

BACKGROUND

A SIM is an integrated circuit that securely stores information relating to a subscriber-based communications system, e.g. cellular telephony. The SIM stores, amongst other data, the service-subscriber key (International Subscriber Identity Module or ISMI) that is used to identify a subscriber on mobile telephony services such as on mobile phones and computers.

Typically, the SIM is held on a removable card (SIM card) provided by the subscriber's network operator, although it can be provided as a fixed, in-situ component or in theory as a file or program stored on internal memory. The removable form of SIM card is preferred as it allows subscribers to keep the same information, including telephone number, when changing portable device. For this purpose, portable devices are required to provide a dedicated hardware connector for the SIM card.

The use of dual SIM handsets is becoming common. Dual SIM handsets allow different users to share a particular handset without the first user having to remove their SIM card. Also, a single user may wish to make selected calls or use data services using different numbers or mobile networks. A typical example is where a first SIM is used for local calls and a second SIM is used for international calls.

There is a small number of handsets that currently provide two SIM connectors; these require additional hardware and, consequently, increase the size of handset. Existing handsets require users to manually change SIM cards. Further, the use of traditional SIM cards and their associated interfaces are limited in terms of the transmission rate, storage capacity and processing capacity that can be offered. Mobile network operators are therefore limited in terms of how they may customise complex services within SIM cards.

Many mobile handsets, data tablets and computers include an expansion card slot, e.g. a secure digital (SD) card slot, which allows users to expand storage capacity. SD cards are available in standard, mini or micro formats. Files in SD memory cards can be directly operated by heterogeneous platforms. In terms of expanding the hardware functionality of a handset, a number of existing standards exist, including the Secure Digital Input Output (SDIO) standard, although this standard requires specific hardware support at the host device and cannot be directly operated by heterogeneous platforms.

SUMMARY

A first aspect of the invention provides apparatus comprising:
  means for converting subscriber identity module [SIM]-related request signals to file access signals, the file access signals identifying at least one location associated with a SIM function on a user removable memory and at least one file access functions; and
  means for communicating the file access signals with the user removable memory via a connector.

The apparatus may comprise means for opening on a memory of the apparatus a file which is mapped by the apparatus to the at least one location associated with the SIM function on the user removable memory, and to communicate the mapping and the at least one file access function to the user removable memory via the connector.

The apparatus may comprise means for converting the SIM-related request signals to read and/or write file access functions for communication to the user removable memory via the connector.

The apparatus may comprise means for converting a first SIM-related request signal to a write file access function and subsequently to transfer the write file access function and a first data parameter contained in the SIM-related request signal to the user removable memory.

The apparatus may comprise means for transferring, after a predetermined time period subsequent to transfer of the first data parameter, a read access signal to the user removable memory and subsequently to receive a second data parameter from, and generated by, a SIM function on the user removable memory.

The apparatus may comprise means for opening on a memory of the apparatus a different file which is mapped by the apparatus to at least one different location associated with the SIM function on the user removable memory, to transfer the mapping and the read access signal to the user removable memory, and to receive from the user removable memory the second data parameter for storage in the opened, different file.

apparatus may comprise means for transferring, as the first data parameter, a service provider's nonce and receiving, as the second data parameter, authentication data generated at the user removable memory using the nonce.

The apparatus may comprise means for providing the SIM-related request signals responsive to external requests received from a mobile communications service provider.

The apparatus may be a mobile communications terminal.

The apparatus may comprise a connector, wherein the connector is configured to electrically connect with a memory card conforming to at least one of a secure digital (SD) format, a multimedia card format, compact flash format, and a personal computer memory cards international association format.

The connector may be provided within a slot or recess accessible from a housing of the apparatus.

A second aspect of the invention provides a method comprising:
  converting subscriber identity module [SIM]-related request signals to file access signals, the file access signals identifying at least one location associated with a SIM function on a user removable memory and at least one file access function; and
  communicating the file access signals with the user removable memory via a connector.

The method may further comprise opening a file which is mapped to at least one location associated with the SIM function on the user removable memory, and communicating the mapping and the at least one file access function with the user removable memory via the connector.

The method may further comprise converting the SIM-related request signals to read and/or write file access functions for communication to the use removable memory via the connector.

The method may further comprise converting a first SIM-related request signal to a write file access function and subsequently transferring the write file access function and a first data parameter contained in the SIM-related request signal to the user removable memory.

The method may further comprise, after a predetermined time period subsequent to the step of transferring the first data parameter, transferring a read access signal to the user removable memory and subsequently receiving a second data parameter from, and generated by, the user removable memory.

The method may further comprise opening on the apparatus a different file which is mapped by the apparatus to at least one different location associated with the SIM function on the user removable memory, transferring the mapping and the read access signal to the user removable memory, and receiving from the user removable memory the second data parameter for storage in the opened, different file.

The method may further comprise transferring, as the first data parameter, a parameter generated by a service provider and receiving, as the second data parameter, authentication data generated at the user removable memory using the service provider's parameter.

The method may further comprise providing the SIM-related request signals responsive to external requests received from a mobile communications service provider.

A third aspect provides a computer program comprising instructions that when executed by computer apparatus control it to perform the above method.

A fourth aspect of the invention provides a non-transitory computer-readable storage medium having stored thereon computer-readable code, which, when executed by computing apparatus, causes the computing apparatus to perform a method comprising:
- converting subscriber identity module [SIM]-related request signals to file access signals, the file access signals identifying at least one location associated with a SIM function on a user removable memory and at least one file access functions; and
- communicating the file access signals with user removable memory via a connector.

A fifth aspect of the invention provides apparatus, the apparatus having at least one processor and at least one memory having computer-readable code stored thereon which when executed controls the at least one processor to perform a method comprising:
- converting subscriber identity module (SIM)-related request signals to file access signals, the file access signals identifying at least one location associated with a SIM function on a user removable memory and at least one file access functions; and
- communicating the file access signals with user removable memory via a connector.

A sixth aspect of the invention provides apparatus comprising:
- a memory;
- a subscriber identity module (SIM) programmable or programmed with data associated with a communications system;
- interface means for receiving file access signals from a host device, the signals including at least one memory location and at least one file access function, and which is configured to identify from the received at least one memory location whether a memory or SIM function is to be applied; and
- processing means responsive to identification that a SIM function is to be applied to convert the at least one file access function to at least one SIM function which is applied to the SIM.

The interface means may be configured to access a predetermined first set of at least one memory location associated with the memory and a predetermined second set of at least one memory location associated with the SIM. The predetermined second set of at least one memory location may comprise virtualised files registered only within the file allocation table (FAT) region of the memory.

The interface means may be configured to convert file access read/write signaling received from the host device to signaling for use in accessing the SIM data.

The processing means may be configured, in response to receiving write file access signaling from the host device, to apply a SIM function which comprises receiving a particular data parameter from the SIM.

The processing means may be configured to pass a first data parameter to the SIM, received from the host device, and to receive the particular second data parameter from the SIM which is generated thereat using the first data parameter.

The processing means may be configured, in response to receiving read file access signaling from the host device, to pass the data parameter received from the SIM to the host device via the interface means by means file access signals appropriate to the host device.

The interface means may be configured, in response to receiving read file access signaling from the host device, to identify, from the received at least one memory location, at least one corresponding physical memory location on the host device to which the data parameter received from the SIM is to be transferred.

The interface means may be configured to receive from the host device, as the first data parameter, a parameter generated by a service provider, wherein the processing means is configured to apply the service provider parameter to the SIM and to receive back from the SIM, as the second data parameter, authentication data for transfer back to the host device in response to a read file access function.

The apparatus may conform at least one of a secure digital (SD) format, a multimedia card format, compact flash format, and a personal computer memory cards international association format.

The apparatus may conform to the secure digital (SD) format and may be configured to receive file access signaling according to the SD storage card standard.

A seventh aspect of the invention provides a method of providing a subscriber identity module (SIM) function in a user removable memory module for use with a host device, the method comprising:
- receiving file access signals from a host device, the signals including at least one memory location and at least one file access function,
- identifying from the received at least one memory location whether a memory or SIM function is to be applied; and
- responsive to identification that a SIM function is to be applied, converting the at least one file access function to at least one SIM functions which is applied to the SIM Identifying may comprise accessing a set of mappings which correspond received physical addresses received from the host device with a predetermined first set of addresses associated with on-board flash memory of the memory module and a predetermined second set of addresses associated with SIM functions.

The predetermined second set of addresses may correspond to virtualised files registered only within the FAT region of the memory.

Converting at least one file access function to at least one SIM function may comprise converting file access read/write signaling received from the host device to signaling for use in accessing the SIM data.

In response to receiving a write file access function from the host device, the method may further comprise applying a SIM function which includes receiving a particular data parameter from the SIM The method may further comprise passing a first data parameter to the SIM, received from the host device, and receiving a particular second data parameter from the SIM, and generated thereat, using the first data parameter.

The method may further comprise, in response to receiving a read file access function from the host device, passing the data parameter received from the SIM to the host device by means of file access signals appropriate to the host device.

The method may further comprise, in response to receiving a read file access function from the host device, identifying from the received at least one memory location at least one corresponding physical memory location on the host device to which the data parameter received from the SIM is to be transferred.

The method may further comprise, receiving from the host device, as the first data parameter, a parameter generated by a service provider's, applying the service provider's parameter to the SIM and receiving back from the SIM, as the second data parameter, authentication data, and transferring back to the host device the second data parameter in response to a read file access function.

An eighth aspect provides a computer program comprising instructions that when executed by computer apparatus control it to perform the above method.

A ninth aspect of the invention provides a non-transitory computer-readable storage medium having stored thereon computer-readable code, which, when executed by computing apparatus, causes the computing apparatus to perform a method comprising:
  to receive file access signals from a host device, the signals including at least one memory location and at least one file access function,
  to identify from the received at least one memory location whether a memory or SIM function is to be applied; and
  to respond to identification that a SIM function is to be applied by converting the at least one file access function to at least one SIM functions which is applied to the SIM.

A tenth aspect of the invention provides apparatus, the apparatus having at least one processor and at least one memory having computer-readable code stored thereon which when executed controls the at least one processor:
  to receive file access signals from a host device, the signals including at least one memory location and at least one file access function,
  to identify from the received at least one memory location whether a memory or SIM function is to be applied; and
  to respond to identification that a SIM function is to be applied by converting the at least one file access function to at least one SIM function which is applied to the SIM.

46. A system comprising a host processing apparatus and a user removable memory module which, in use, is connected to a connector of the host processing apparatus, and in which:

(i) the host processing apparatus comprises:
  at least one processor and at least one memory having computer-readable code stored thereon which when executed controls the at least one processor:
  to convert subscriber identify module [SIM]-related request signals to file access signals, the file access signals identifying at least one location on the user removable memory and at least one file access functions; and
  to communicate the file access signals with the user removable memory via the connector, and
(ii) the user removable memory comprises:
  a memory;
  a SIM programmable or programmed with data associated with a communications system;
  interface means for receiving the file access signals from the host processing apparatus, and configured to identify from the at least one location therein whether a memory or SIM function is to be applied; and
  processing means responsive to identification that a SIM function is to be applied to convert the at least one file access function to at least one SIM function which is applied to the SIM for transfer back to the host processing apparatus.

BRIEF DESCRIPTION OF THE DRAWINGS

Embodiments of the present invention will now be described, by way of example only, with reference to the accompanying drawings, in which.

DETAILED DESCRIPTION OF VARIOUS EMBODIMENTS

Embodiments described herein relate to a user removable memory card with in-built SIM functionality and a host apparatus configured to communicate with the memory card to achieve SIM functionality through a standard memory card hardware interface.

Specifically, embodiments relate to a SD memory card apparatus with an in-built SIM function (SD-SIM) enabling a host apparatus with a SD slot to utilise SIM functions through an existing SD slot without requiring a change in hardware. All that is required is appropriate software which can be provided on the host or by means of a software update which can be downloaded from a network or the on-board memory of the SD-SIM itself.

Communication between the host apparatus and the SD-SIM is performed using read/write signaling in accordance with SD standards. No change is required to the host apparatus's hardware to achieve this function, thereby enabling devices with existing SD hardware to achieve SIM functionality, for example dual or further SIM functionality; without requiring further, SIM-specific hardware, on the handset.

Embodiments described herein also provide a SD-SIM which includes flash memory, as is the norm with SD cards, in addition to the SIM functionality. This memory can be used by the host apparatus for memory expansion purposes in the conventional manner, and provides a way in which updated software required by the host to access the SD-SIM can be acquired. Therefore, the SD-SIM can be provided as a true plug-and-play apparatus.

To achieve this, use of a so-called Universal Sensor Data (uSD) method is employed. uSD has been developed by the Applicant and further details can be found in uSD: Universal Sensor Data Entry Card, by Chunxiao Jiang et al in IEEE Transactions on Consumer Electronics, Vol. 56, No. 3, August 2010, and US Patent Publication No. US20090287636, the entire contents of both of which are incorporated herein by reference. In brief, uSD is a platform independent hardware expansion method based on the SD standard, using the known SD card slot profile, transport protocol and File Allocation Table (FAT) file system. Compared with known card-based expansion systems, such as the known Secure Digital Input Output (SDIO) system, uSD requires no extra hardware such as SDIO host controllers, or software such as SDIO adapters, bus and client drivers, at the host. Accordingly, host devices having the hardware and software for memory expansion using a removable SD card can, using the embodiments described herein, achieve SIM functionality without specialised hardware and across heterogeneous platforms.

For the sake of convenience, and as introduced above, the following discussion will focus on SD card memories, which can be any of the standard, mini or micro formats, but the discussed implementations could be applied to other user removable memory. Examples include the multimedia card format, the compact flash (CF) format and the personal computer memory cards international association (PCMCIA) format.

To assist understanding of the embodiments, a brief description of a SIM and its function will now be described.

A SIM is usually an integrated circuit provided on a removable card. SIM cards store network-specific information used to authenticate and identify subscribers on a given mobile network. This information includes, among other data, the service-subscriber key or International Mobile Subscriber Identity (IMSI) which is used to identify a subscriber on a mobile telephony device, the integrated circuit card identifier (ICCID) which is unique to the card, an authentication key Ki, and an encryption key Kc. The authentication key Ki is a 128-bit value used in authenticating the SIM on the mobile network Each SIM holds a unique Ki assigned to it by the operator during the personalization process. The Ki is also stored in a database on the carrier's network.

The authentication process performed between the host device, to which the SIM is connected, and the network (mobile operator) is generally as follows.

Initially, when the host device is switched on, the IMSI is read from the SIM card and passed to the mobile operator over the network for requesting access and authentication. The operator searches its database and acquires the Ki corresponding to the received IMSI. The operator then generates a random number (RAND) and signs it with the acquired Ki to compute a signed response SRES_1. The operator then sends RAND over the network back to the host, which transfers RAND to the SIM. The SIM signs RAND with its own version of Ki, to compute a further response SRES_2. SRES_2 and the encryption key is then provided to the host which transmits SRES_2 back to the operator over the network. The operator then compares SRES_1 with SRES_2; if the two numbers match, the SIM is authenticated and the host device is granted communications access to the operator's network with Kc being used to encrypt subsequent communications between the host and the network.

Figure 1:
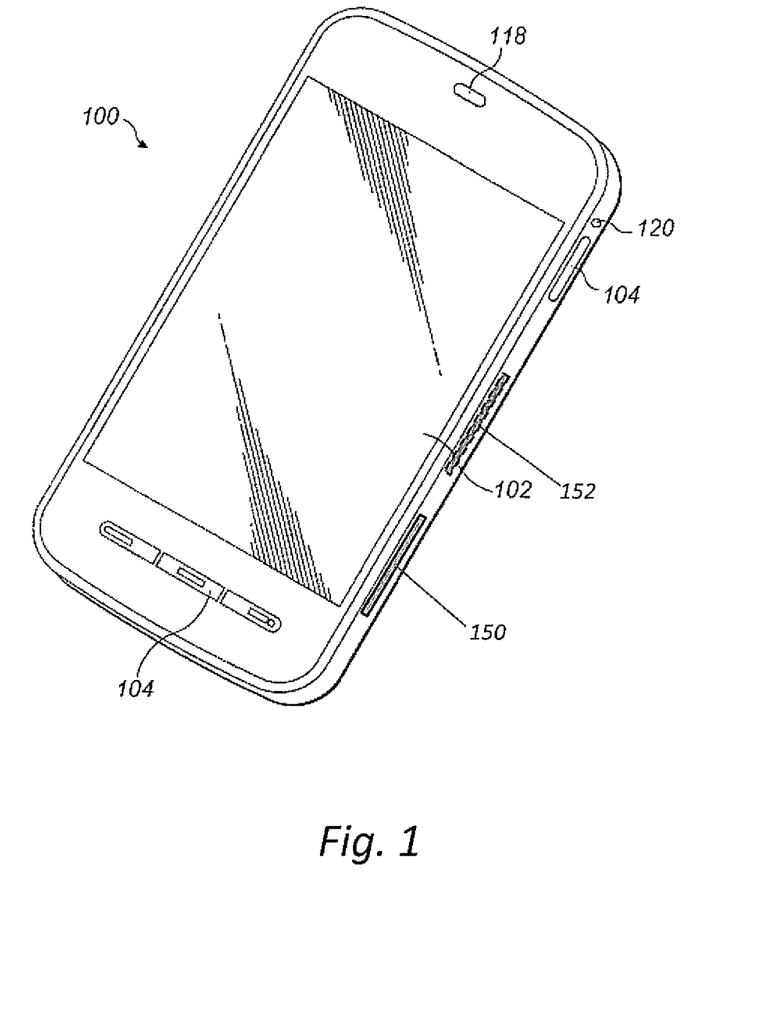
FIG. 1 is a perspective view of a mobile terminal embodying aspects of the invention.

Referring now to the Figures, FIG. 1 shows a portable communications terminal 100. The exterior of the terminal 100 has a touch sensitive display 102, hardware keys 104, a speaker 118 and a headphone port 120. Also provided on a peripheral edge of the terminal 100 is a SD card slot 150 (or SD host connector to give it its more proper term) into which a SD card can be inserted. Within the SD card slot 150 are provided connectors which, when a SD card is fully inserted into the slot, make electrical communication with corresponding connectors of the SD card. Further SD card slots can also be provided on the edge of the terminal 100, as indicated by the dotted line and referenced by numeral 152.

The above-described terminal 100 will hereafter be referred to as the 'host terminal' 100.

Figure 2:
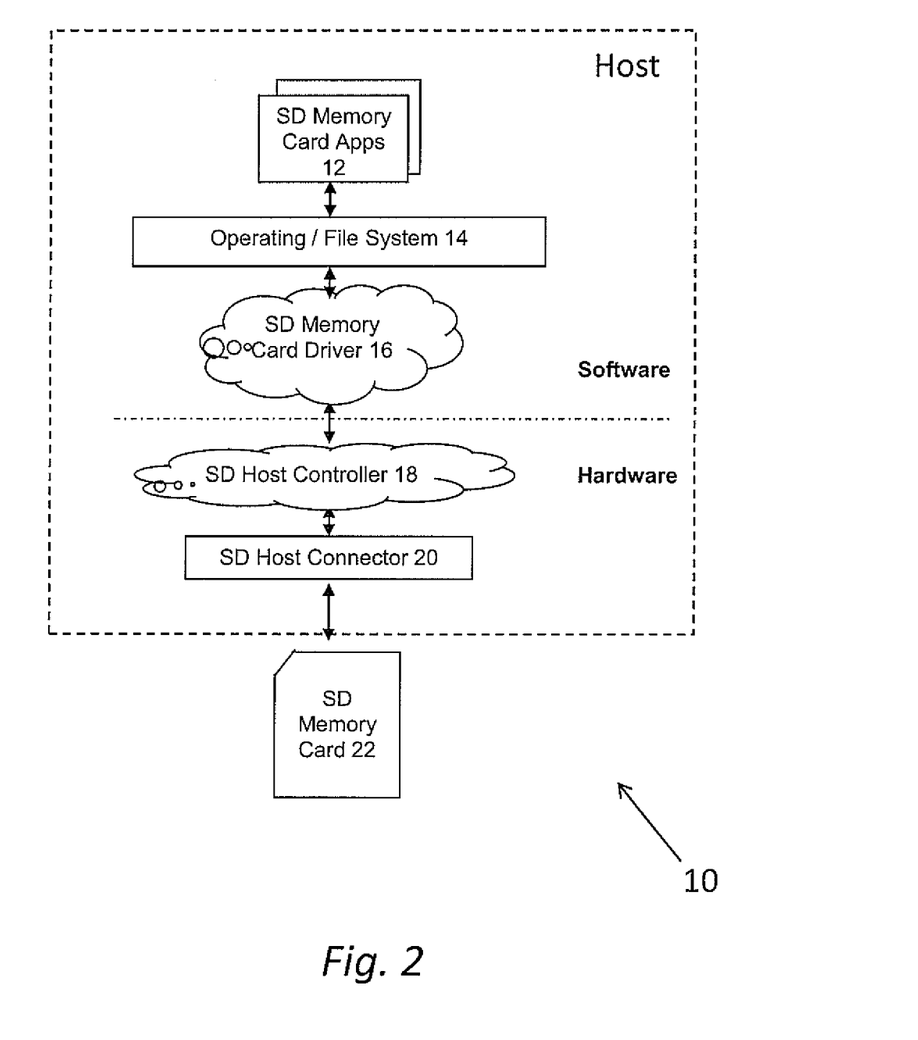
FIG. 2 is a schematic diagram illustrating functional components of a conventional SD memory card system.

Referring now to FIG. 2, as further background, there is shown a generalised platform-independent SD memory card architecture 10 which is known in the art.

At the top level is/are one or more SD memory card applications (Apps) 12 which can communicate with the SD memory card 22 through Application Programming Interfaces APIs. A file system 14 is provided by the relevant operating system, as is conventional, for example for providing the relevant 'open', 'read' and 'write' commands as and when required. The SD memory card driver 16, in the downwards direction, makes signaling interactions with the SD memory card 22 through the host connector. The SD memory card driver 16 provides access to files in the SD memory card 22, via the file system 14 in the operating system, such that the memory card applications 12 can realise application-layer functions by the file access functions. The SD host controller 18 is hardware which, in the downwards direction, makes signaling interactions with the SD memory card 22 through the SD host connector 20 (which is the mechanical card slot) and, in the upwards direction, provides a register interface.

Figure 3:
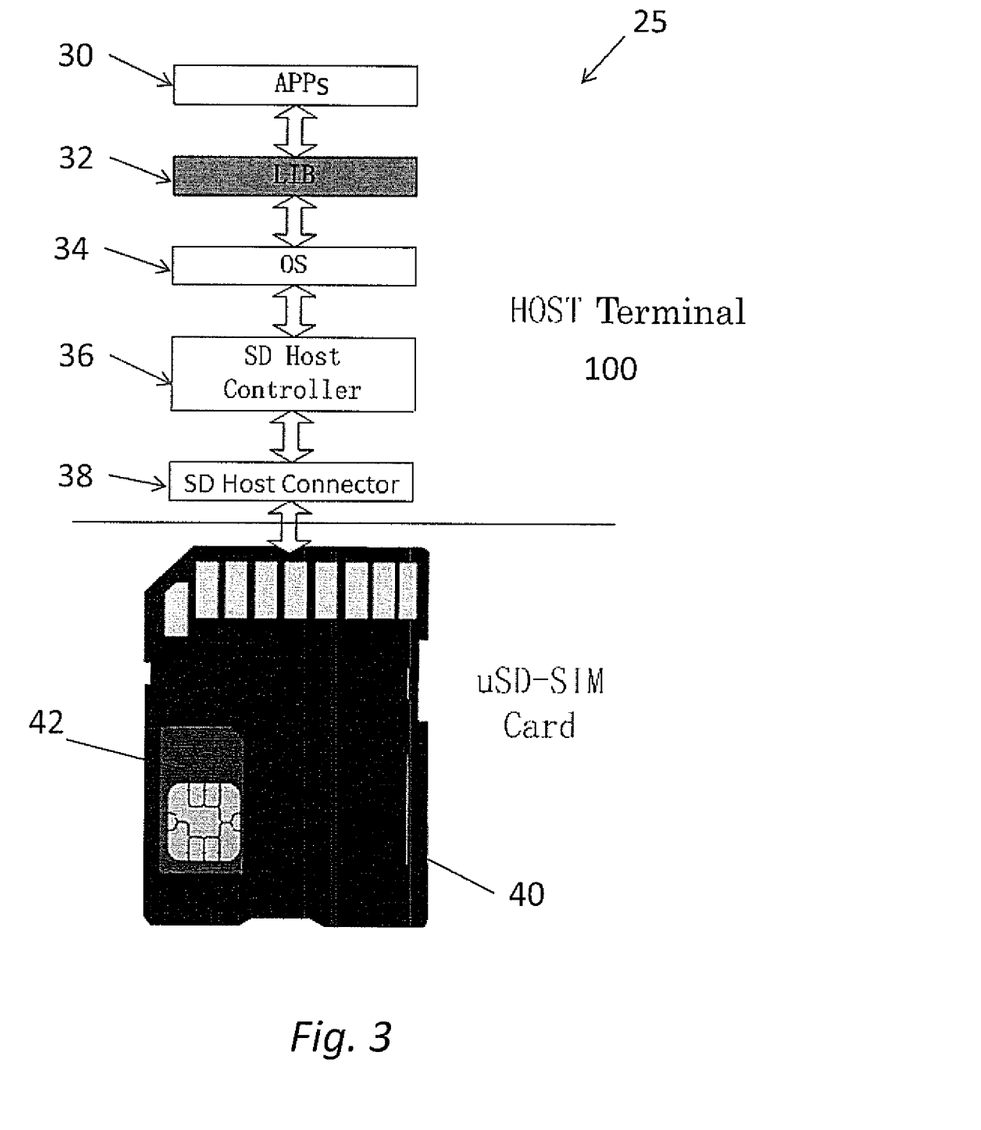
FIG. 3 is a schematic diagram illustrating in overview functional components relating to a modified SD memory card system in accordance with a first embodiment of the invention.

Referring to FIG. 3, a uSD architecture 25 according to a preferred embodiment is shown. In the host terminal 100 are provided one or more applications (Apps) 30, a library (LIB) 32, an operating system (OS) 34, a SD host controller 36 and a SD host connector 38. It will therefore be appreciated that the only host-side component that is new is LIB 32, which is embodied in software; there is no change in host-side hardware. A more detailed description of the LIB 32 will, follow. Also shown in FIG. 3 is a uSD-SIM card 40 which includes flash memory (not shown) for providing memory expansion to the host 100, as well as a SIM 42 for providing SIM functionality as described previously. The uSD-SIM card 40 has the same physical form as a conventional SD card.

Figure 4:
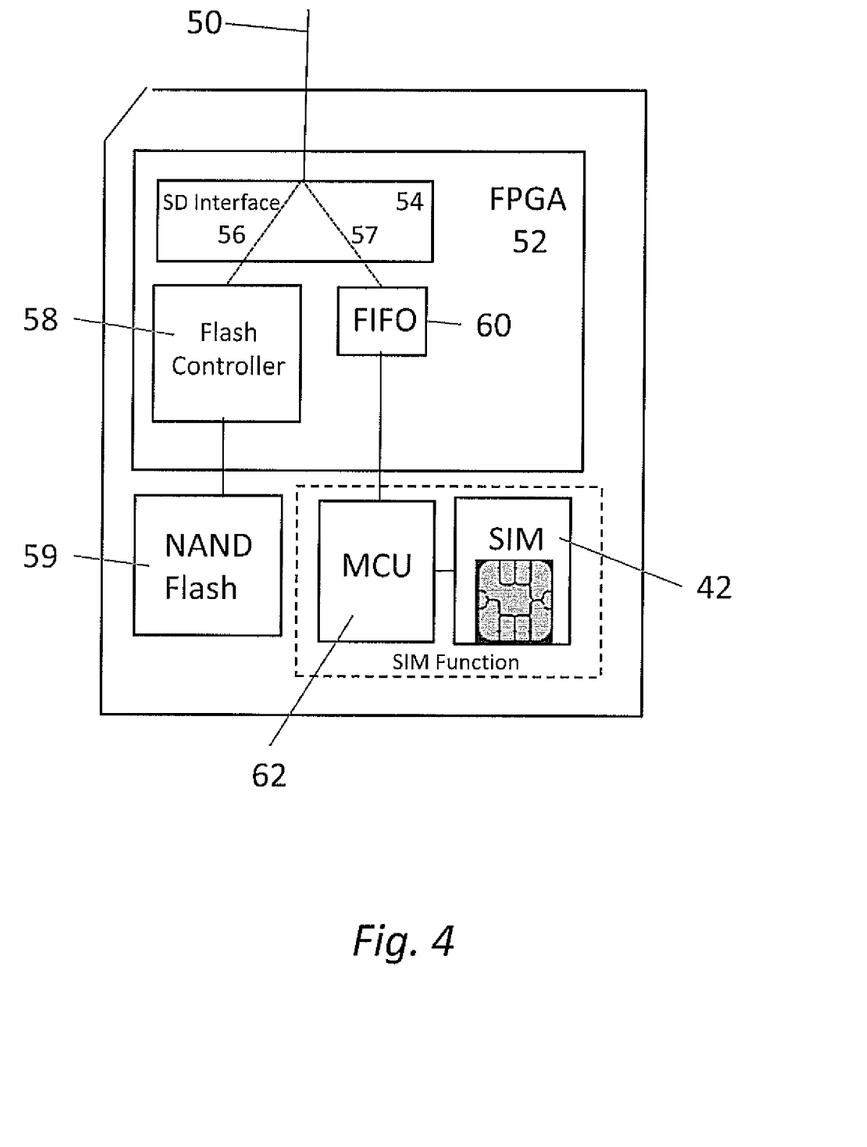
FIG. 4 is a schematic diagram illustrating, in further detail, functional components of a SD memory card with SIM functionality, as shown in overview in FIG. 3.

Referring to FIG. 4, a more detailed architecture of the uSD-SIM 40 is shown according to an exemplary embodiment. The connectors which make electrical contact with the host's SD host connector 38 are represented a SD bus 50.

There are three main modules within the uSD-SIM 40, namely a FPGA 52, NAND flash 59 and the SIM function, comprising a microcontroller unit (MCU) 62 and the actual SIM 42.

Within the FPGA 52 is a SD interface 54 which offers the basic SD protocol, including analysing and translating commands from the host terminal 100, and transferring responses and data. When the host terminal 100 wishes to access files on the uSD-SIM card 40, the SD interface 54 acts as a data path selector depending on the address or addresses indicated by the host terminal. As indicated, a first data path 56 is shown, at the logical level, connecting the SD bus 50 to the NAND flash 59 via a conventional flash controller 58. This NAND flash 59 represents memory that is used to expand the host's own memory capabilities in the normal manner, A second data path 57 is shown, at the logical level, connecting the SD bus 50 to the SIM function (MCU 62 and SIM 42) via a FIFO buffer 60. This data path 57 is therefore selected when the host terminal 100 indicates a different predetermined range of values.

Figure 5:
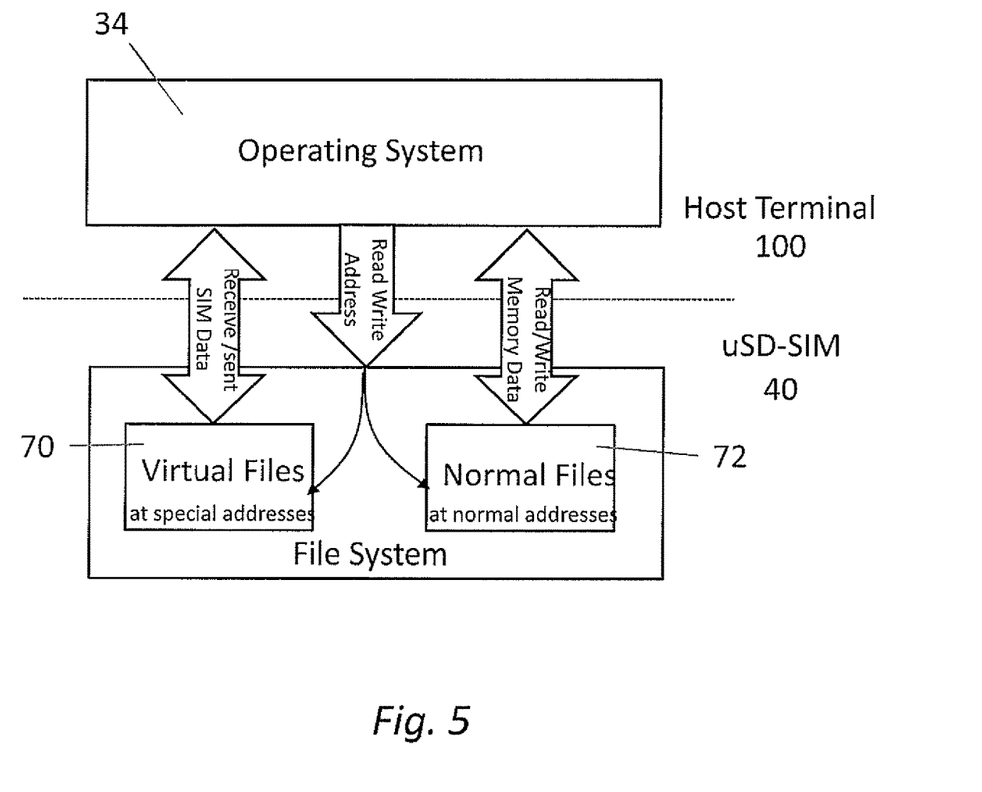
FIG. 5 is a schematic diagram illustrating a file exchange method employed by components illustrated in FIG. 3.

At this stage, it is useful to explain the uSD addressing and so-called "special file" method. With reference to FIG. 5, there are shown (at the software level) file access interactions between the host operating system 34 and the uSD-SIM card 40. The uSD-SIM 40 is configured with the FAT file system but some files are specially organised, There are provided some virtual files 70, where 'virtual' means that these files are only registered in the FAT region of memory with names and addresses but without any concrete content. Although they are virtualised, the host terminal 100, when connected, can see the virtual files 70 and can access them like normal files using for example open, read and write commands. The access addresses of the virtual files are specific and predetermined; when the host terminal 100 accesses the virtual files 70, they can be translated into operations, in this case SIM functions. Accordingly, in the preferred embodiment, the addresses of the virtual files 70 are associated with SIM functions (commands) and accordingly if the host terminal 100 requests access to one or more of such virtual files, the relevant command and data is mapped by the SD interface 54 to the MCU 62 which processes the command/data to perform the required function using the SIM 42.

The other, normal, files are associated with the NAND flash 59 and hence if the host terminal 100 addresses these files, conventional file read/write signaling can be performed.

SIM operations are performed in a request (from the host terminal 100) and response (to the host terminal) manner. When the host terminal 100 makes a request, it sends information to the SIM 42, which may for example be a compute/calculate SRES_2 command with a RAND parameter (the command is the operator and the parameter is the operand), which command tells the SIM what to do. This request involves making a write operation to a virtual file 70. The SD interface 54 in the uSD-SIM 40 detects the write operation using the special address provided, and maps this address to the MCU 62 rather than the NAND flash 59. The parameter or command is then applied to the SIM 42, e.g. by executing the "computer/calculate SRES_2" command. A subsequent read operation is performed by the host terminal 100 to collect the expected data, e.g. the SRES_2. When the host terminal 100 wants to receive information from the SIM 42, it reads a virtual file 70. The SD interface 54 in the uSD-SIM 40 detects this read operation using the 'special' address provided, and maps this address to the MCU 62 rather than the NAND flash 59. The MCU 62 executes the relevant command to acquire data from the SIM 42 and puts the data into the FIFO 60, The host terminal 100 will be responded to with this FIFO data, and from the host terminal's point of view, the data is the contents of the virtual file it accessed.

Therefore, data interactions between the host terminal 100 and the uSD-SIM 40 are based on conventional SD standard file operations, these being truly platform independent and plug-and-play as in a conventional SD card.

Figure 6:
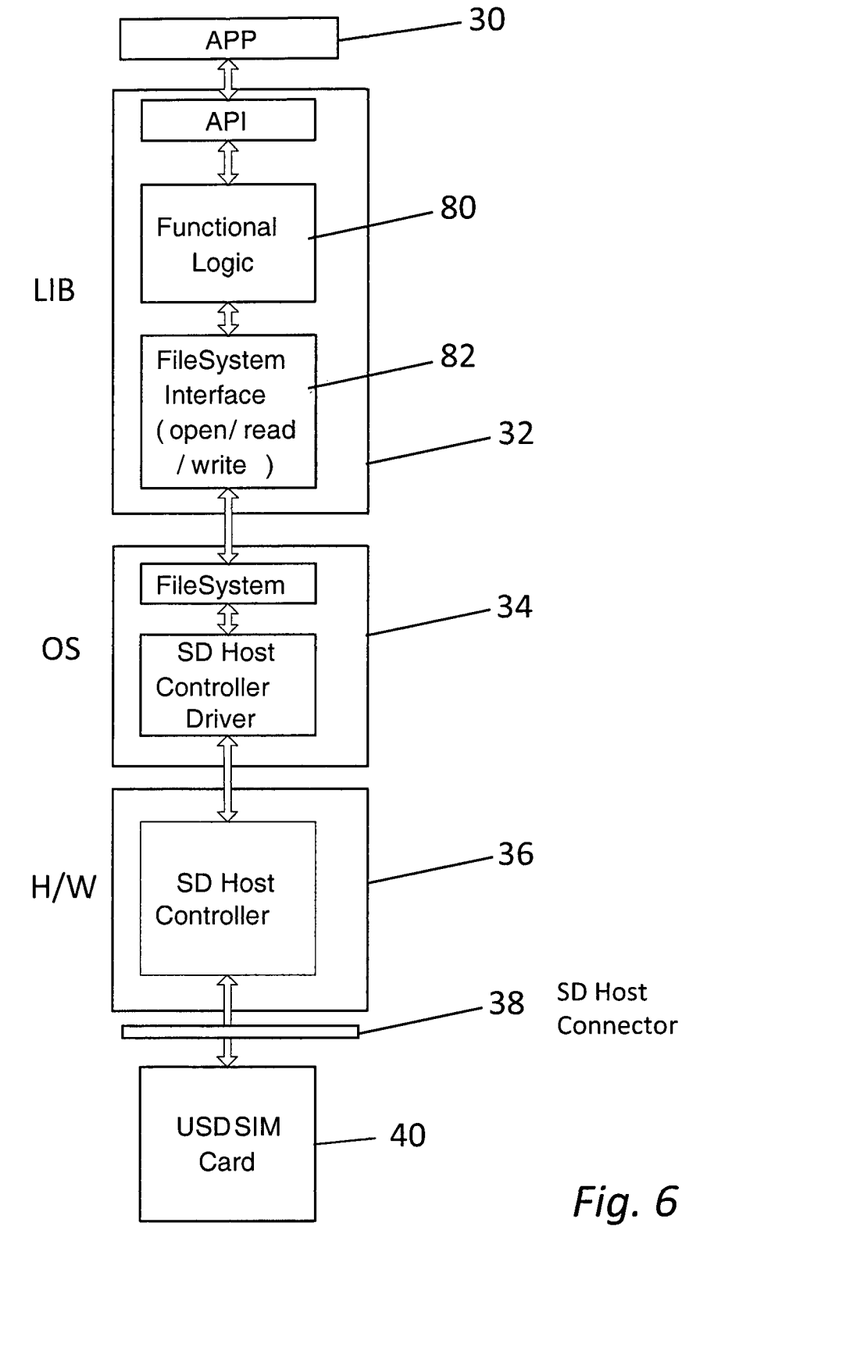
FIG. 6 is a schematic diagram illustrating, in further detail, functional components of a SD memory card interface as employed in the mobile terminal of FIG. 1.

Referring now to FIG. 6, a more detailed architecture of the host terminal 100 architecture is shown. At the upper level is/are one or more APP(s) which are application programs one or more of which may need to access SIM functionality, e.g. an APP for initiating a connection to a cellular network.

The LIB 32 comprises a number of components. Conventional APIs are provided, including SIM APIs, for handling signals received from the APP(s) 30. Functional logic 80 and a file system interface 82 within the LIB 32 is configured to translate the API calls from APPs into file operations, such as open, read and/or write functions, which are of course standard functions in the SD protocol. As mentioned previously, the LIB 32 components can be provided in a software update with no hardware change being required.

The operating system (OS) 34 comprises a file system for performing for example the requested open, read and/or write functions, and the SD host controller driver 34 are conventional, as is the SD host controller 36 and connector 38 (both hardware).

Figure 7:
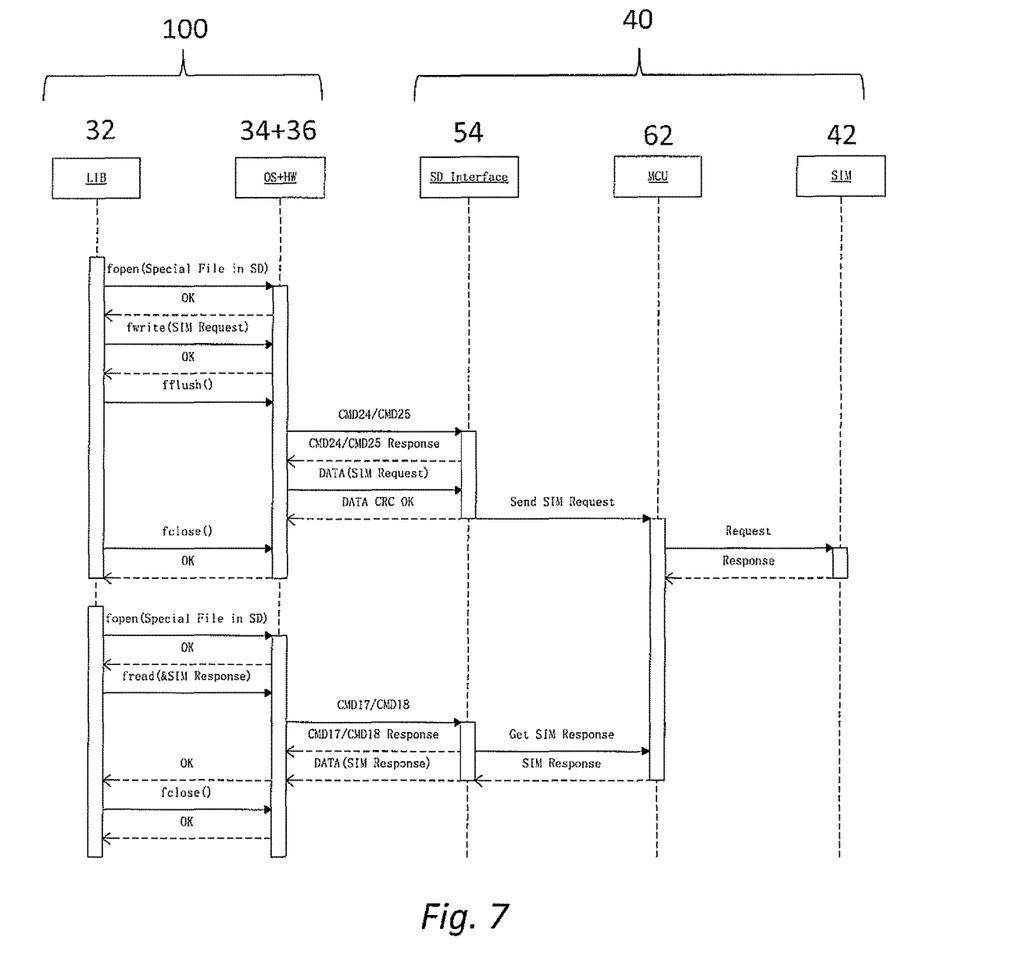
FIG. 7 is a sequence or collaboration diagram indicating the sequence of file exchange events performed in accordance with the embodiment.

Referring now to FIG. 7, there is shown a sequence/collaboration diagram which indicates the sequence of operations performed between the host terminal 100 and the uSD-SIM card 40 in sending data ("SIM REQUEST") to the SIM 42 in order to obtain a new result or return value ("SIM RESPONSE") generated by the SIM 42.

On the left hand side of the diagram, the LIB 32 actually refers to the file system interface component 82, and the operating system 34 and SD host controller 36 are combined as OS+HW for convenience.

Initially, when an APP initiates access to the uSD-SIM card 40, LIB 32 translates the APP's "SIM access signal" to one or more file access signal(s) in a form suitable for the OS 34. More particularly in this example embodiment, the LIB 32 causes the OS 34 to perform a file open (fopen(SPECIAL FILE in uSD)) action and a file write (fwrite(SIM REQUEST)) action, both of which are acknowledged back to the LIB in the conventional manner. The SPECIAL FILE in uSD comprises a physical address that is mapped to the MCU 62 by the uSD-SIM's SD interface 54.

For most of the OS 34, the write operation writes data to a file buffer on RAM instead of the uSD-SIM 40 and so, as will be understood, the LIB 32 may use a 'file flush' or fflush operation in order to instruct the OS 34 to move data to the uSD-SIM 40.

The OS+HW 34, 36 transfers the address in "SPECIAL FILE" in uSD-SIM 40 to the SD interface 54 using the standard SD write command CMD24/CMD25, waits for the acknowledgement response, and then transfers the SIM REQUEST data, which is again acknowledged.

At the uSD-SIM card 40, the SD interface 54 interprets the "SPECIAL FILE in uSD" address which is a virtual file mapped to the MCU 62, and which corresponds to a particular SIM function. The MCU 62 then decodes the received command and passes the SIM REQUEST data to the SIM 42. The response from the SIM 42 can be buffered at this stage.

In the host terminal 100, the LIB 32 can close the file with a fclose( ) command, if required.

In order for the host terminal 100 to retrieve the SIM Response from the uSD-SIM 40, the LIB 32 first waits for a predetermined time period. Next, the LIB 32 causes the OS 34 to perform a file open (fopen(SPECIAL FILE in uSD)) action and a file read (fread(SIM RESPONSE)) action. The SPECIAL FILE in uSD usually comprises a different physical address than that mentioned above, although it is also mapped to the MW 62 by the uSD-SIM's SD interface 54.

The OS+HW 34, 36 transfers the "SPECIAL FILE in uSD" address to the SD interface 54 using the standard SD read command CMD17/CMD18 and waits for the acknowledgement response.

At the uSD-SIM card 40, the SD interface 54 interprets the "SPECIAL FILE in uSD" address which is a virtual file mapped to the MCU 62, and which corresponds to a particular SIM function. The MCU 62 then decodes the received 'read' command to get the previously buffered SIM RESPONSE data which is buffered to the SD interface 54. The SD interface 54 returns the response to the host's OS+HW 34, 36 as data. The OS+HW 34, 36 fills the data into the buffer specified by the file read operation and returns. The LIB 32 receives the response and forwards to the APP 30 through its API.

The above write and read process is applicable to the previously-described SIM function, whereby the host apparatus 100 authenticates itself to the network by means of using the RAND parameter, which is applied to the uSD-SIM 40 in a write operation and the resulting SRES-2 parameter is read by the host apparatus 100 for transmission to the network operator.

It will be appreciated that the above principle of operation using SD standard file open, read and/or write functions can be used in any number, order and combination.

It will also be appreciated that the term SIM equally applies to equivalent subscriber modules, for example the Universal Integrated Circuit Card UICC which runs on UMTS handsets and the Removable User Identity Module R-UIM which is popular in CDMA-based devices.

To summarise, a SD Memory Card Interface 54 is provided on a SD memory card 40 in order to transform the SD Memory Card file access command signaling, which had originated from the host terminal 100 (via SD Host Controller 36 and the SD Host Connector 38) into an appropriate format of signaling which can be used by the SIM 42 to perform the SIM expansion. The SD Memory Card's Interface 54 then returns the results of the operation to the host in the form of file access results/responses.

Given that the host apparatus 100 at least supports the expansion of storage capacity using the SD card format, the modified SD card 40 provides both a memory and SIM expansion of the SD memory card without the host apparatus 100 having to use signaling which is only appropriate for the particular SIM functionality provided by the memory card. Read/write commands can be used, at least from the perspective of the host apparatus 100 to control the expanded operation provided by the SD memory card 40.

In this way, the SIM 40 is identified to the host apparatus 100 as a SD Memory Card, and hence addresses the "platform heterogeneity" issue, and achieves a more platform independence capability.

All programs (e.g. special applications which are OS&CPU independent, normal applications and special drivers which are OS/CPU dependent) can be saved in the SD storage card 40, in order to realize the "plug-and-play" capability.

The additional time required to implement this method is now considered. The time required by the LIB 32 and OS+HW 34, 36 is platform dependent and so we only consider the additional time required by the SD Interface 54.

Note that the SD interface 54 can send back data (SD Interface: DATA(SIM Response)) when the MCU 62 has got the SIM response in its buffer (SIM response). The time between the beginning of SD Controller's write (OS+HW: CMD24/CMD25) and the end of read (OS+HW: CMD17/CMD18, and the DATA is sent back) operations can be estimated as follows:

$$\begin{aligned} T_{SDControllerWriteToRead} &= T_{CMD24/25} + T_{Response24/35} + T_{DATAWritten} + \\ &\quad T_{MCU\text{-}SIM} + T_{DATARead} \\ &= 48 \times T_{SDClk} + 48 \times T_{SDClk} + 528 \times T_{SDClk} + \\ &\quad T_{MCU\text{-}SIM} + 528 \times T_{SDClk} \\ &= 1152 \times \frac{1}{25 \text{ MHz}} + T_{MCU\text{-}SIM} \\ &= 1152 \times \frac{1}{25 \text{ MHz}} + T_{MCU\text{-}SIM} \\ &= 46.08 \ uS + T_{MCU\text{-}SIM} \end{aligned}$$

$T_{MCU\text{-}SIM}$ is the SIM access time, which is similar to the access time of a normal SIM reader. Thus, it can be concluded that the additional access time is about 50 μS, which is caused by the SD interface 54.

It will be appreciated that the above described embodiments are purely illustrative and are not limiting on the scope of the invention, Other variations and modifications will be apparent to persons skilled in the art.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

What is claimed is:

1. A method comprising:
converting subscriber identity module (SIM)-related request signals to file access signals, the file access signals identifying at least one location associated with a SIM function on a user removable memory and at least one file access function;
communicating the file access signals with the user removable memory via a connector; the user removable memory configured for both SIM function and read and/or write file access function;
after a predetermined time period subsequent to the step of transferring a first data parameter, transferring a read access signal to the user removable memory and subsequently receiving a second data parameter from, and generated by, the user removable memory; and
opening a different file which is mapped to at least one different location associated with the SIM function on the user removable memory, transferring the mapping and the read access signal to the user removable memory, and receiving from the user removable memory the second data parameter for storage in the opened, different file.

2. A method according to claim 1, further comprising opening a file which is mapped to at least one location associated with the SIM function on the user removable memory, and communicating the mapping and the at least one file access function with the user removable memory via the connector.

3. A method according to claim 1, further comprising converting a first SIM-related request signal to a write file access function and subsequently transferring the write file access function and a first data parameter contained in the SIM-related request signal to the user removable memory.

4. A method according to claim 1, further comprising transferring, as the first data parameter, a parameter generated by a service provider and receiving, as the second data parameter, authentication data generated at the user removable memory using the service provider's parameter.

5. A method according to claim 1, further comprising providing the SIM-related request signals responsive to external requests received from a mobile communications service provider.

6. A non-transitory computer-readable storage medium having stored thereon computer-readable code, which, when executed by computing apparatus, causes the computing apparatus to perform a method comprising:
 converting subscriber identity module (SIM)-related request signals to file access signals, the file access signals identifying at least one location associated with a SIM function on a user removable memory and at least one file access functions;
 communicating the file access signals with user removable memory via a connector, the user removable memory configured for both SIM function and read and/or write file access function;
 after a predetermined time period subsequent to the step of transferring a first data parameter, transferring a read access signal to the user removable memory and subsequently receiving a second data parameter from, and generated by, the user removable memory; and
 opening a different file which is mapped to at least one different location associated with the SIM function on the user removable memory, transferring the mapping and the read access signal to the user removable memory, and receiving from the user removable memory the second data parameter for storage in the opened, different file.

7. Apparatus, the apparatus having at least one processor and at least one memory having computer-readable code stored thereon which when executed controls the at least one processor to perform a method comprising:
 converting subscriber identity module (SIM)-related request signals to file access signals, the file access signals identifying at least one location associated with a SIM function on a user removable memory and at least one file access functions;
 communicating the file access signals with user removable memory via a connector; the user removable memory configured for both SIM function and read and/or write file access function;
 after a predetermined time period subsequent to the step of transferring a first data parameter, transferring a read access signal to the user removable memory and subsequently receiving a second data parameter from, and generated by, the user removable memory; and
 opening a different file which is mapped to at least one different location associated with the SIM function on the user removable memory, transferring the mapping and the read access signal to the user removable memory, and receiving from the user removable memory the second data parameter for storage in the opened, different file.

8. Apparatus comprising:
 a memory;
 a subscriber identity module (SIM) programmable or programmed with data associated with a communications system;
 interface means for receiving file access signals from a host device, the signals including at least one memory location and at least one file access function, and which is configured to identify from the received at least one memory location whether a memory or SIM function is to be applied;
 processing means responsive to identification that a SIM function is to be applied to convert the at least one file access function to at least one SIM function which is applied to the SIM;
 receiving a write file access signal;
 after a predetermined time period subsequent to the step of transferring a first data parameter, receiving a read access signal and transferring a second data parameter; and
 opening a different file which is mapped to at least one different location associated with the SIM function, receiving the mapping and the read access signal, and transferring the second data parameter for storage in the opened, different file.

9. Apparatus according to claim 8, wherein the interface means is configured to access a predetermined first set of at least one memory location associated with the memory and a predetermined second set of at least one memory location associated with the SIM, the memory configured for both SIM function and read and/or write file access function.

10. Apparatus according to claim 9, wherein the predetermined second set of at least one memory location comprise virtualised files registered only within the file allocation table (FAT) region of the memory.

11. Apparatus according to claim 8, wherein the interface means is configured to convert file access read/write signalling received from the host device to signalling for use in accessing the SIM data.

12. Apparatus according to claim 11, wherein the processing means is configured, in response to receiving write file access signalling from the host device, to apply a SIM function which comprises receiving a particular data parameter from the SIM.

13. Apparatus according to claim 12, wherein the processing means is configured to pass a first data parameter to the SIM, received from the host device, and to receive the particular second data parameter from the SIM which is generated thereat using the first data parameter.

14. Apparatus according to claim 12, wherein the processing means is configured, in response to receiving read file access signalling from the host device, to pass the data parameter received from the SIM to the host device via the interface means by means file access signals appropriate to the host device.

15. Apparatus according to claim 14, wherein the interface means is configured, in response to receiving read file access signalling from the host device, to identify, from the received at least one memory location, at least one corresponding physical memory location on the host device to which the data parameter received from the SIM is to be transferred.

16. Apparatus according to claim 13 wherein the interface means is configured to receive from the host device, as the first data parameter, a parameter generated by a service provider, wherein the processing means is configured to apply the service provider parameter to the SIM and to receive back from the SIM, as the second data parameter, authentication data for transfer back to the host device in response to a read file access function.

17. A method of providing a subscriber identity module (SIM) function in a user removable memory module for use with a host device, the method comprising:
receiving file access signals from a host device, the signals including at least one memory location and at least one file access function,
identifying from the received at least one memory location whether a memory or SIM function is to be applied;
responsive to identification that a SIM function is to be applied, converting the at least one file access function to at least one SIM functions which is applied to the SIM;
receiving a write file access signal;
after a predetermined time period subsequent to the step of transferring a first data parameter, receiving a read access signal and transferring a second data parameter; and
opening a different file which is mapped to at least one different location associated with the SIM function, receiving the mapping and the read access signal, and transferring the second data parameter for storage in the opened, different file.

* * * * *